United States Patent
Agarwal

(10) Patent No.: US 11,256,423 B2
(45) Date of Patent: Feb. 22, 2022

(54) EFFICIENTLY IDENTIFYING COMMAND READINESS BASED ON SYSTEM STATE AND DATA SPREAD IN MULTI QUEUE DEPTH ENVIRONMENT

(71) Applicant: WESTERN DIGITAL TECHNOLOGIES, INC., San Jose, CA (US)

(72) Inventor: Dinesh Kumar Agarwal, Karnataka (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/600,953

(22) Filed: Oct. 14, 2019

(65) Prior Publication Data

US 2021/0109654 A1 Apr. 15, 2021

(51) Int. Cl.
*G06F 3/06* (2006.01)
*G06F 16/907* (2019.01)

(52) U.S. Cl.
CPC ............ *G06F 3/061* (2013.01); *G06F 3/0658* (2013.01); *G06F 3/0659* (2013.01); *G06F 3/0679* (2013.01); *G06F 16/907* (2019.01)

(58) Field of Classification Search
CPC ...... G06F 3/061; G06F 3/0958; G06F 3/0659; G06F 3/0679; G06F 16/907
See application file for complete search history.

(56) References Cited

U.S. PATENT DOCUMENTS

| | | | |
|---|---|---|---|
| 6,574,676 B1 | 6/2003 | Megiddo | |
| 7,010,653 B2 | 3/2006 | Uchida et al. | |
| 8,171,242 B2 | 5/2012 | Hong | |
| 9,645,866 B2 * | 5/2017 | Bourd | G06T 1/60 |
| 9,927,983 B2 | 3/2018 | Benisty et al. | |
| 10,642,684 B1 * | 5/2020 | MacLaren | G06F 3/0619 |
| 2010/0153659 A1 * | 6/2010 | Lovell | G06F 13/1642 711/151 |
| 2013/0212319 A1 * | 8/2013 | Hida | G06F 3/0659 711/103 |
| 2015/0212738 A1 * | 7/2015 | D'Eliseo | G06F 12/00 711/154 |
| 2015/0271232 A1 * | 9/2015 | Luby | H04L 67/02 709/231 |
| 2016/0162186 A1 * | 6/2016 | Kashyap | G06F 12/0246 711/103 |
| 2019/0196716 A1 * | 6/2019 | Xiao | G06F 3/0604 |
| 2019/0243774 A1 * | 8/2019 | Liao | G06F 12/0246 |
| 2019/0370199 A1 * | 12/2019 | Tomlin | G06F 12/0862 |

* cited by examiner

*Primary Examiner* — Eric T Oberly
(74) *Attorney, Agent, or Firm* — Arent Fox LLP

(57) ABSTRACT

Aspects of a storage device are provided which allow a read command to be identified for execution from multiple read commands received from a host. The storage device includes a memory configured to store a plurality of data units each comprising one or more data fragments, and metadata associated with the data units. A controller is configured to receive from the host a plurality of read commands each requesting one of the data units. The controller is further configured to identify one of the read commands based on the metadata, and to transfer the data unit associated with the identified read command to the host before transferring the data unit associated with the other read commands.

20 Claims, 8 Drawing Sheets

EFFICIENTLY IDENTIFYING COMMAND READINESS BASED ON SYSTEM STATE AND DATA SPREAD IN MULTI QUEUE DEPTH ENVIRONMENT

BACKGROUND

Field

This disclosure is generally related to electronic devices and more particularly to storage devices.

Background

Storage devices enable users to store and retrieve data. Examples of storage devices include non-volatile memory devices. A non-volatile memory generally retains data after a power cycle. An example of a non-volatile memory is a flash memory, which may include array(s) of NAND cells. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. This control tables are used to track the physical location of logical sectors, or blocks, in the flash memory. The control tables are stored in the non-volatile memory to enable access to the stored data after a power cycle.

In a multi-queue depth environment, a controller for the flash storage device may receive multiple read commands from a host device. The commands are stored in a queue which the controller may select for execution. When the controller selects a read command from the queue, the controller reads a data for the selected command from the non-volatile memory using the control tables and transfers the data for that read command to the host device before selecting the next command in the queue. When the data for the command is stored contiguously in one block, the data may be quickly read and transferred, and the latency in performing the next command may be minimal. However, when the data is scattered in various blocks of the non-volatile memory, the time taken to read and transfer the data to the host device may be substantial. As a result, if commands are executed in the order they are received, subsequent but faster commands may be inefficiently delayed by earlier but slower commands.

SUMMARY

One aspect of a storage device is disclosed herein. The storage device includes a memory configured to store data units each comprising one or more data fragments. The memory is also configured to store metadata associated with the data units. The storage device further includes a controller configured to receive from a host a plurality of read commands each requesting one of the data units. The controller is further configured to identify one of the read commands based on the metadata, and to transfer the data unit associated with the identified read command to the host before transferring the data unit associated with the other read commands.

Another aspect of a storage device is disclosed herein. The storage device includes a memory configured to store data units each comprising one or more data fragments. The memory is also configured to store metadata associated with the data units. The storage device further includes a controller configured to receive from a host a first sequence of read commands each requesting one of the data units. The controller is further configured to transfer to the host the data units requested by the read commands in a second sequence different from the first sequence based on the metadata.

A further aspect of a storage device is disclosed herein. The storage device includes a memory configured to store data units each comprising one or more data fragments. The memory is also configured to store metadata associated with the data units. The storage device further includes a controller configured to receive from a host a first read command followed by a second read command each requesting one of the data units. The controller is further configured to transfer to the host the data unit requested by the second read command before the data unit requested by the first read command based on the metadata.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
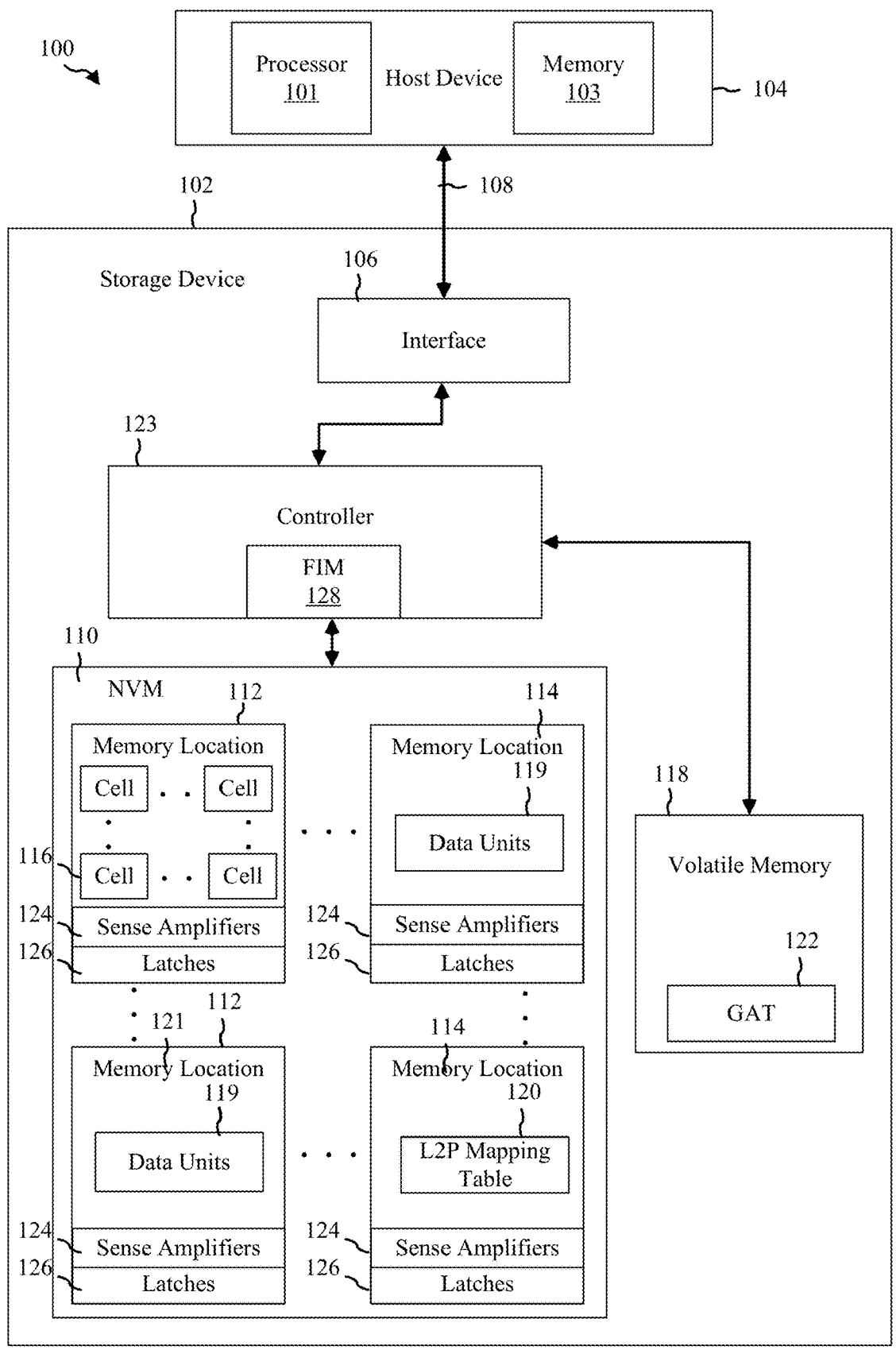
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

Generally, when a storage device receives multiple read commands from a host device for associated data, the controller selects to execute one of the read commands and transfers the corresponding data in order for the selected command before executing other commands. For instance, if the storage device receives two read commands, the storage device may select the first read command and transfer all the data associated with the first read command before beginning to transfer any data associated with the second read command. The data transferred for different commands is not interleaved. However, selecting commands as they are received may not be efficient when the data associated with the selected command is scattered across various blocks in various data fragments. For example, if the first read command has more data fragments scattered among various blocks than the second read command, the time taken to locate, sense, and transfer every data fragment for the first read command may be greater than that for the second read command. As a result, other commands may be inefficiently delayed in execution until the data for a selected command is fully transferred, increasing command latency and reducing quality of service (QoS).

To minimize the overall latencies of executing read commands and provide higher QoS, the present disclosure allows the storage device to select for execution an optimal read command based on a system state of the storage device. The system state may encompass, for example, an availability of corresponding control data (e.g. logical to physical mappings), the memory storing the data, whether the data is scattered in the memory, and the state of the data (e.g. sensed and awaiting transfer to the host device). Based on the system state and the availability of various data fragments for transfer to the host device, the storage device calculates a command readiness factor for each read command and selects the command to execute with the highest command readiness factor. The storage device then transfers the data unit associated with the selected read command to the host device before identifying the next command to be executed. In this way, the latency of the storage device in executing multiple read commands may be minimized and QoS thereby improved.

As used herein, a "data unit" is the set of data requested by a read command which is stored in the memory, while a "data fragment" is a subset of a data unit stored in one or more sequential or contiguous locations of the memory (e.g. cells on the same word line or bit line). One or more data fragments may comprise a single data unit. For example, in a storage device having one die and two planes of NAND cells, a data unit of 128 KB (or some other number) may be written to and read from the memory in four data fragments of 32 KB (or some other number and size). Depending on the length of the data being written, lower sizes or higher sizes of data fragments may be created.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, Hiper-LAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

As shown in the exemplary embodiment of FIG. 1, the storage device 102 includes non-volatile memory (NVM) 110 for non-volatilely storing data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the illustrated exemplary embodiment of FIG. 1, each memory location 112 may be a block 114 including multiple cells 116. Other examples are possible; for instance, each memory location may be a die containing multiple blocks, and each block may include SLCs, MLCs, TLCs, and/or QLCs. Moreover, each memory location may include one or more blocks in a 3-D NAND array. Alternatively, each memory location 112 may not be a block, but may instead be one or more cells 116 or one or more pages of cells. Any size of memory location 112 (e.g. cell(s), page(s), block(s), die(s), etc.) may be configured. Moreover, the illustrated memory locations 112 may be logical blocks, pages or cells which are mapped to one or more physical blocks, pages, or cells.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer and a read buffer for temporarily storing data. While FIG. 1 illustrate the volatile memory 118 as being remote from a controller 123 of the storage device 102, the volatile memory 118 may be integrated into the controller 123.

The memory (e.g. NVM 110) is configured to store data units 119 received from the host device 104. As an example, FIG. 1 illustrates data units being stored in different memory locations 112, although the data units may be stored in the same memory location. In another example, the memory locations 112 may be different dies, and the data units may be stored in one or more of the different dies.

Figure 2:
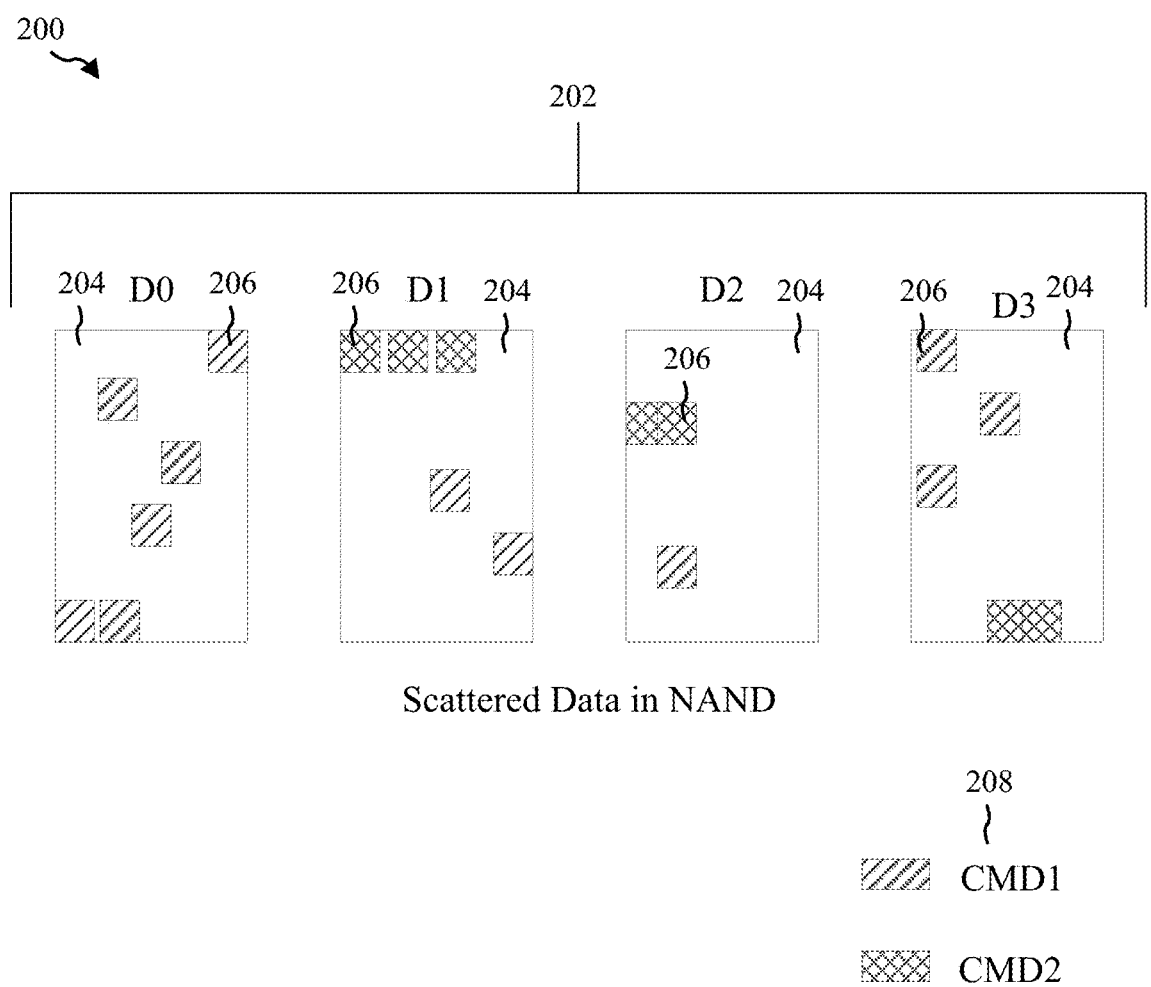
FIG. 2 is a conceptual diagram illustrating an example of data fragments in a non-volatile memory of the storage device of FIG. 1.

FIG. 2 illustrates an example diagram 200 of a non-volatile memory 202 including four dies 204 (e.g. D0, D1, D2, and D3), where data fragments 206 of data units corresponding to two different read commands 208 are scattered across the different dies. The non-volatile memory may correspond to NVM 110 of FIG. 1, the dies 204 may correspond to memory locations 112 of FIG. 1, and the data fragments 206 may be stored in different cells, pages, or blocks. While FIG. 2 illustrates an example arrangement of data fragments 206 for commands 208, the data fragments may have different numbers and/or arrangements than illustrated.

Each of the data fragments 206 may be associated with a logical address. For example, referring back to FIG. 1, the NVM 110 may store a logical-to-physical (L2P) mapping table 120 for the storage device 102 associating each data fragment with a logical address. The L2P mapping table 120 stores the mapping of logical addresses specified for data written from the host 104 (e.g. data fragments) to physical addresses in the NVM 110 indicating the location(s) where each of the data fragments are stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 3:
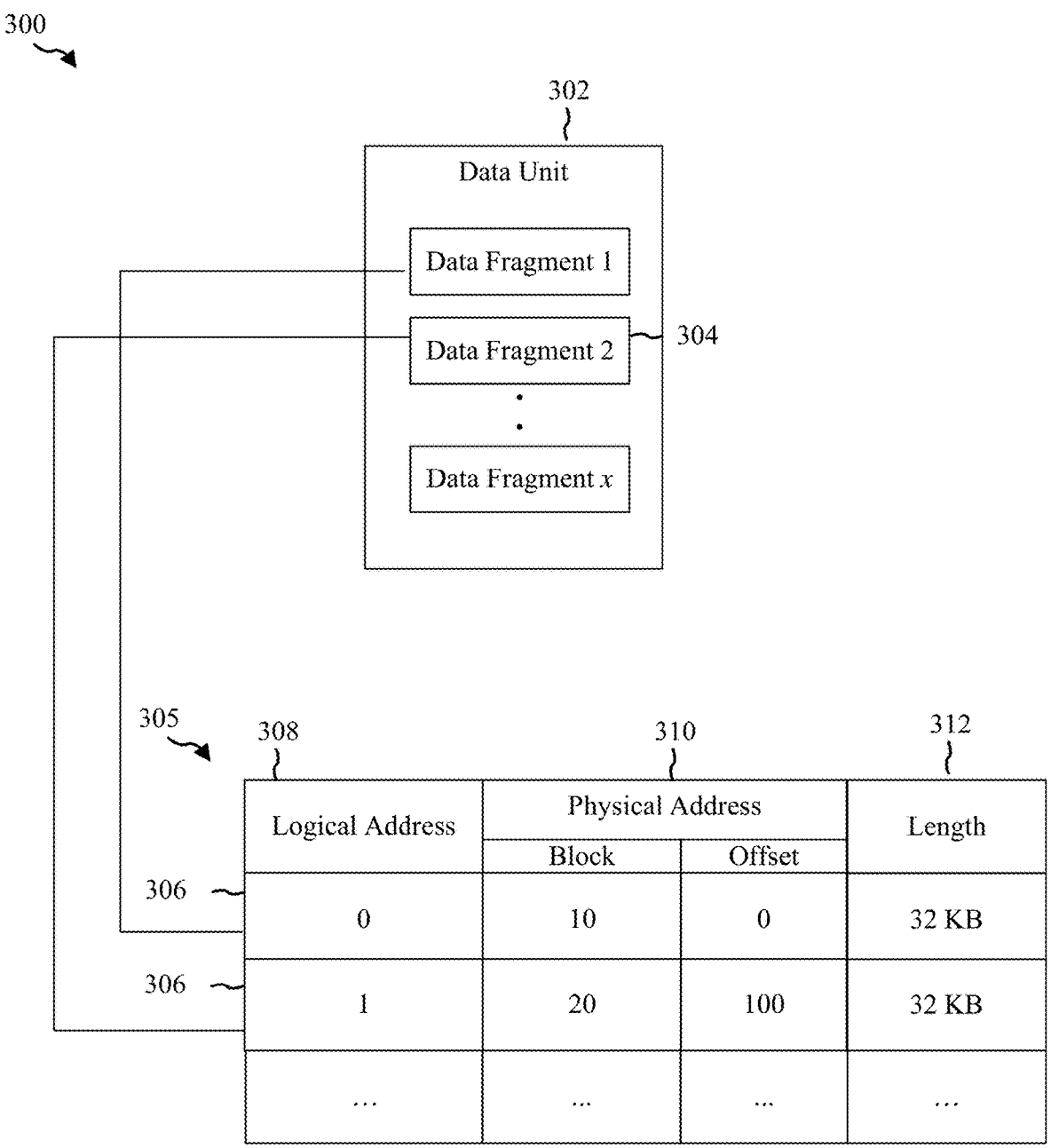
FIG. 3 is a conceptual diagram illustrating an example of a logical-to-physical mapping table in a non-volatile memory of the storage device of FIG. 1.

FIG. 3 is a conceptual diagram 300 of an example of an L2P mapping table 305 illustrating the mapping of data fragments 304 from data units 302 received from a host device to logical addresses and physical addresses in the NVM 110 of FIG. 1. The data units 302 may correspond to the data units 119 in FIG. 1, while L2P mapping table 305 may correspond to L2P mapping table 120 in FIG. 1. In one exemplary embodiment, the data unit 302 may include data fragments 1 to x, where x is the total number of data fragments in the data unit being written to the storage device 102. Each data fragment 304 may be mapped to an entry 306 of the L2P mapping table 305 identifying a logical block address (LBA) 308, a physical address 310 associated with each data fragment written to the NVM, and a length 312 of the data fragment. LBA 308 may be a logical address specified in a write command for the data fragment received from the host device. Physical address 310 may indicate the block and the offset at which the data fragment associated with LBA 308 is physically written. Length 312 may indicate a size of the written data fragment (e.g. 32 KB or some other size).

The volatile memory 118 also stores a global address table (GAT) 122 for the storage device 102. The GAT 122 includes entries showing the mapping of logical addresses specified for data fragments requested by the host 104 to physical addresses in NVM 110 indicating the location(s) where the data is stored. This mapping may be performed by the controller 123. When the controller 123 receives a read command or a write command for a data unit 119 (e.g. data unit 302 including data fragments 304), the controller checks the GAT 122 for the logical-to-physical mapping of each data fragment. If a mapping is not present (e.g. it is the first request for the data), the controller accesses the L2P mapping table 120 and stores the mapping in the GAT 122. When the controller 123 executes the read command or write command, the controller accesses the mapping from the GAT and reads the data from or writes the data to the NVM 110 at the specified physical address. The GAT may be stored in the form of a table or other data structure which includes a logical address associated with each memory location 112 in NVM where data is being read.

Figure 4:
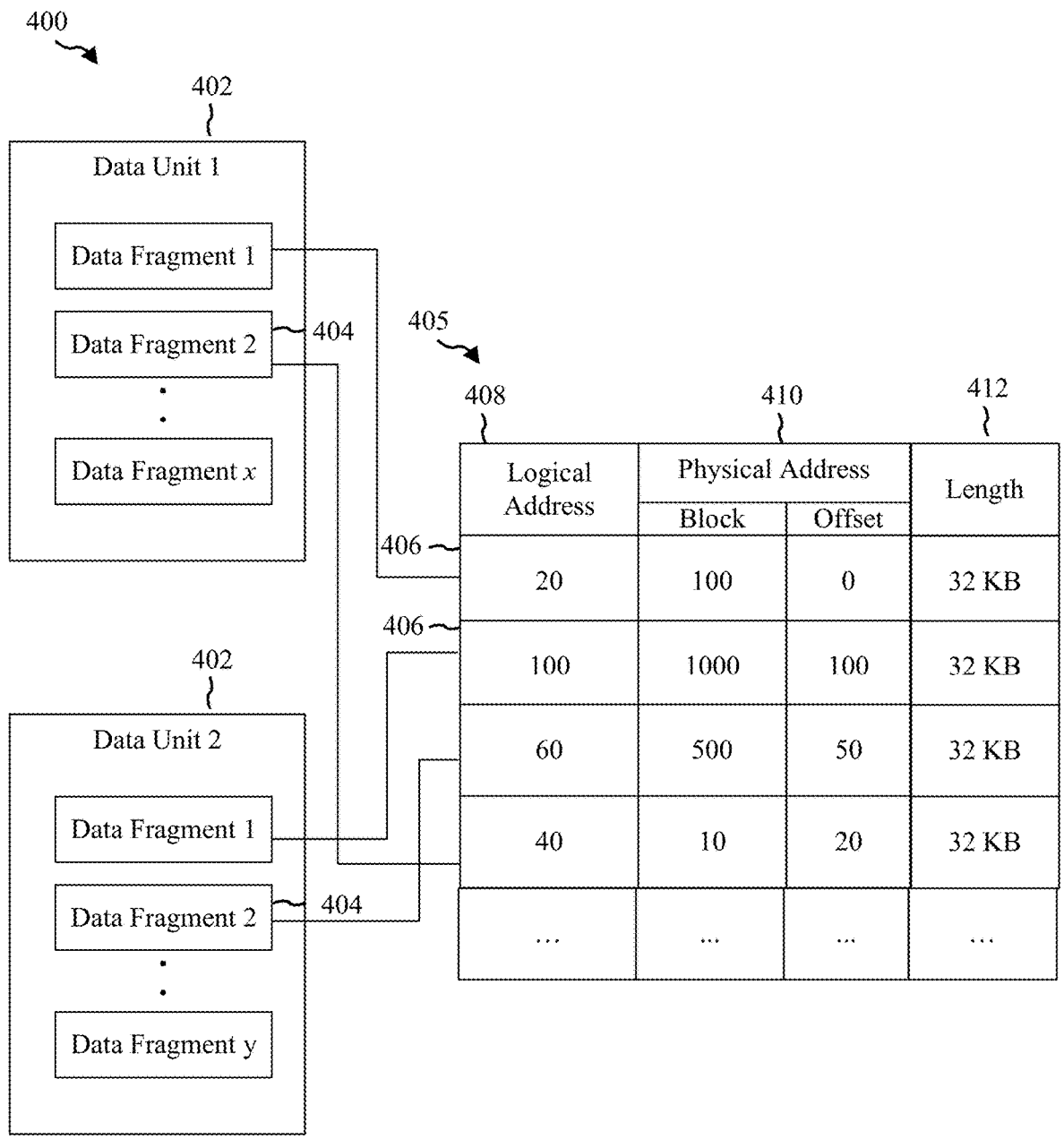
FIG. 4 is a conceptual diagram illustrating an example of a global address table (GAT) in a volatile memory of the storage device of FIG. 1.

FIG. 4 is a conceptual diagram 400 of an example of a GAT 405 illustrating the mapping of data fragments 404 from data units 402 received from a host device to logical addresses and physical addresses in the NVM 110 of FIG. 1. The data units 402 may correspond to the data units 119 in FIG. 1 and data units 302 in FIG. 3, while GAT 405 may correspond to GAT 122 in FIG. 1. In one exemplary embodiment, one data unit 402 may include data fragments 1 to x, where x is the total number of data fragments in the data unit being read from the storage device 102 for one command. Moreover, another data unit 402 may include data fragments 1 to y, where y is the total number of data fragments in the data unit being read from the storage device 102 for another command, and y may be the same as or different from x. Each data fragment 404 may be mapped to an entry 406 of the GAT 405 identifying a logical block address (LBA) 408, a physical address 410 associated with each data fragment read from the NVM, and a length 412 of the data fragment. LBA 408 may be a logical address specified in a read command for the data fragment received from the host device. Physical address 410 may indicate the block and the offset at which the data fragment associated with LBA 408 is physically read. Length 412 may indicate a size of the data fragment (e.g. 32 KB or some other size).

Referring back to FIG. 1, the NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123 by a flash interface module (FIM) 128 of the controller, after which the data is stored in the volatile memory 118 until it is transferred to the host device 104. The volatile memory 118 may thus serve as a transfer random access memory (TRAM) for the storage device 102. When data is written to the cells 116 of the memory location 112, the FIM 128 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof. The controller 123 includes a FIM 128 which serves as the communication interface to the NVM 110. For example, the FIM 128 may receive data transferred from the data latches 126 connected to the various memory locations 112 in response to a read command, and the FIM 128 may send data to the data latches 126 to be programmed into the various cells 116 in response to a write command.

The controller 123 is configured to receive multiple read commands from the host device 104. For example, the controller 123 may receive a plurality of read commands, store the commands in a queue in the volatile memory 118, and may execute the commands to read data in order from the NVM 110 for transfer to the host device 104. The controller 123 is further configured to access the L2P mapping table 120 in the NVM 110 and the GAT 122 in the volatile memory 118. For example, the controller 123 may receive logical-to-physical address mappings from the NVM 110 and the GAT 122 on initial read commands and from the GAT 122 on subsequent read commands. The controller 123 is also configured to read the data received from host 104 from one or more memory locations 112. For example, the controller 123 may read the data fragments by activating the sense amplifiers 124 to sense the data from cells 116 into data latches 126, and the controller 123 may receive the data from the data latches 126 through the FIM 128.

The controller 123 may be implemented with embedded software that performs the various functions of the controller described throughout this disclosure. Alternatively, software for implementing each of the aforementioned functions may be stored in the NVM 110 or in a memory external to the storage device 102 or host device 104, and may be accessed by the controller 123 for execution by the one or more processors of the controller 123. Alternatively, the functions of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) associated with a data unit, as well as a length of the data unit to be written. The interface element 106 receives the write command and if the length of the data unit exceeds a threshold (e.g. 32 KB or some other number), the controller 123 fragments the data unit. The controller allocates a memory location 112 in the NVM 110 of storage device 102 for storing the data (e.g. each data fragment). The controller 123 stores the L2P mapping in the NVM (and the GAT 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data (e.g. each data unit) from the storage device 102 by sending a read command specifying one or more logical addresses associated with the data to be retrieved from the storage device 102, as well as a length of the data to be read. The interface 106 receives the read command, and the controller 123 accesses the L2P mapping in the GAT 122 or otherwise the NVM to translate the logical addresses specified in the read command to the physical addresses indicating the location of the data. The data may be comprised of data fragments. The controller 123 then reads the requested data from the memory location 112 specified by the physical addresses by sensing the data using the sense amplifiers 124 and storing them in data latches 126 until the read data is returned to the host 104 via the host interface 106. If the requested data was fragmented, the controller combines the data fragments into the data unit before returning the data unit to the host 104.

Referring to FIGS. 1-4, when multiple read commands 208 are received from the host device 104 via the host interface 106, the controller 123 may execute the commands in the order they are received. However, if the data units 119 associated with the read commands 208 include data fragments 206 which are scattered in the NVM 110 (for example, across multiple dies 204), the execution of one of the read commands may inefficiently delay execution of the other read command(s). For example, the data for the selected read command may not be fully available for transfer (e.g. one or more data fragments 206 may have been sensed but not yet transferred from the data latches 126). As another example, an entry 406 for the L2P mapping of each data fragment 206 may not yet be in the GAT 122, 405, in which case execution of the command may need to be deferred until the control entry 406 is loaded into the GAT.

To minimize the latency in executing a plurality of read commands received from the host device 104, the controller 123 may be configured to identify one of the read commands for execution based on metadata associated with the data units 119 stored in the NVM 110. The metadata may include a length of each data fragment 206 and a fragment state of each data fragment 206. The controller may be further configured to calculate a command readiness factor indicating an availability for transfer of the data unit 119 associated with each read command 208, and to identify the read command with the highest command readiness factor. To calculate the command readiness factor, the controller may be configured to calculate a fragment readiness factor indicating a respective availability for transfer of each data fragment 206 of the data unit 119 associated with each read command 208. Each fragment readiness factor may be calculated based on a weightage corresponding to the fragment state of each data fragment 206, and optionally based on a sub-weightage corresponding to the fragment state of each data fragment 206 relative to the fragment states of other data fragments 206, as further described below with respect to FIG. 5.

Figure 5:
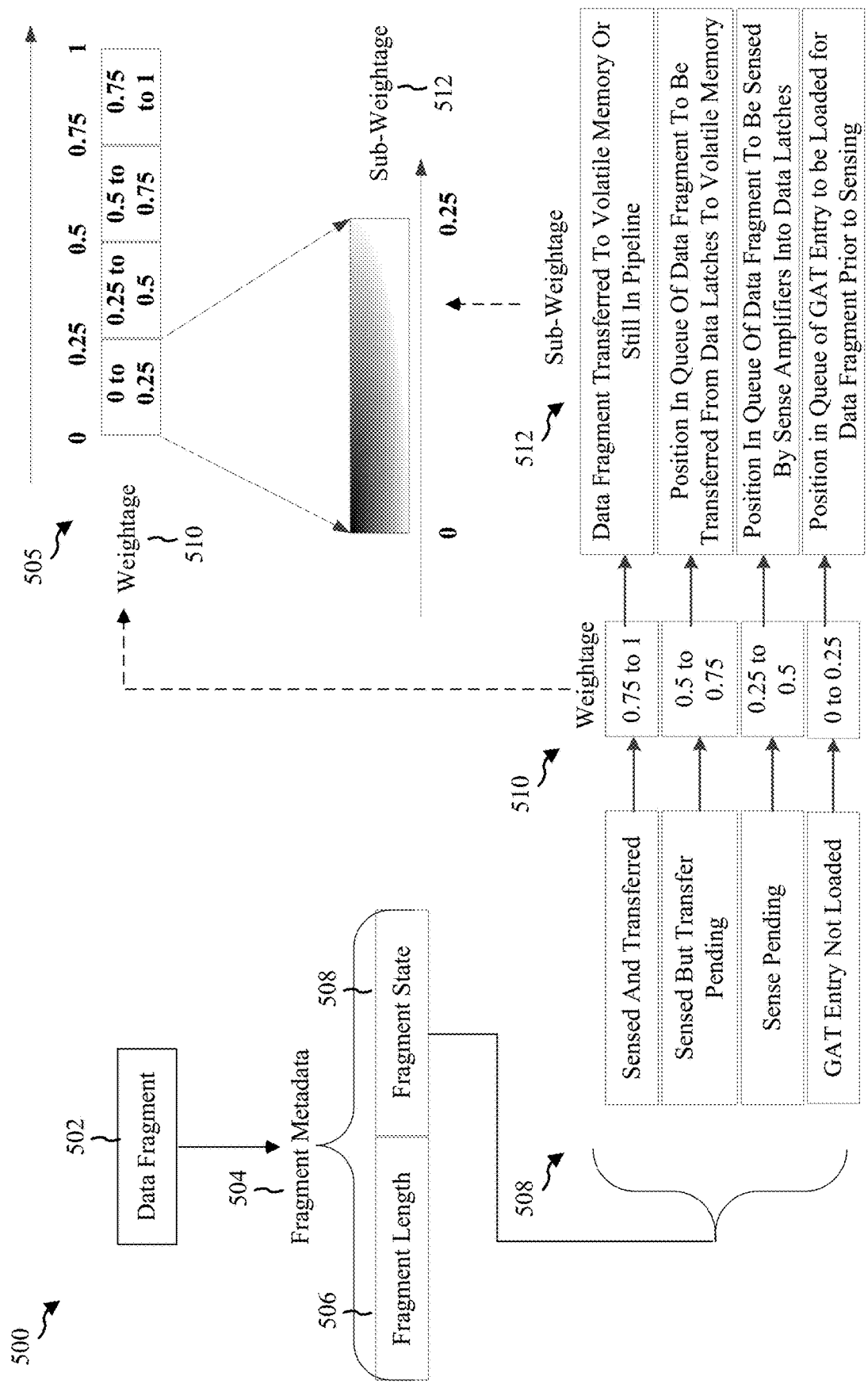
FIG. 5 is a conceptual diagram illustrating different fragment states, weightages, and sub-weightages of the data fragments in the storage device of FIG. 1.

FIG. 5 illustrates an example diagram 500 of a data fragment 502 associated with metadata 504 from which a fragment readiness factor 505 may be determined. The data fragment 502 may correspond to data fragments 206, 304, or 404 in FIGS. 2-4. The metadata 504 is stored in the volatile memory 118 of FIG. 1. Alternatively, the metadata 504 may be stored in one or more of the memory locations 112 in the NVM 110 of FIG. 1. The metadata 504 of each data fragment 502 includes a fragment length 506 and a fragment state 508. The fragment length 506 is the size of the fragment (for example, 32 KB or some other number). The fragment state 508 indicates a status of the data fragment 502 in the storage device 102, which may include one of the following: sensed and transferred, sensed but transfer pending, sense pending, or GAT entry not loaded.

In the GAT entry not loaded state, the controller 123 has received a read command for a data unit 119 including the data fragment 502, but the data fragment does not have an associated logical-to-physical mapping entry (or look up entry) in the GAT (e.g. GAT 122, 405). For example, the read command may be the first command to read the data fragment, and so the controller has not yet loaded an entry 406 in the GAT 405 corresponding to the entry 306 in the L2P mapping table 305. In the sense pending state, the controller 123 has loaded the entry for the data fragment 502 in the GAT, but the data fragment has not yet been sensed from the NVM 110. For example, the controller 123 has identified the physical address of the cell(s) 116 containing the data fragment 502 from the GAT 122, but has not yet activated a sense amplifier 124 to sense the data, or the sense amplifiers 124 are sensing other data on the bit lines prior to the data fragment 502. In the sensed but transfer pending state, the controller 123 has sensed the data fragment 502 using the sense amplifiers 124 into the data latches 126, but the data has not yet been transferred from the data latches to the controller 123 through the FIM 128. For example, the data latches 126 may be shift registers, and the FIM 128 may be receiving other data from the registers prior to the data fragment 502. Lastly, in the sensed and transferred state, the FIM 128 has received the data fragment 502 from the data latches 126 into the volatile memory 118, which may be for example a RAM located remote from the controller 123 (e.g. an intermediate RAM) or a RAM integrated with the controller 123 (e.g. a TRAM), and the data fragment is awaiting transfer by the controller 123 to the host device 104.

Each fragment state 508 corresponds to a weightage 510 or priority from which the fragment readiness factor 505 is determined. The weightage may be scaled to a factor of 1, with each number indicating a respective availability of the data fragment 502 for transfer to the host device 104. For example, FIG. 5 illustrates that the sensed and transferred state has a maximum weightage of 1, the sensed but transfer pending state has a maximum weightage of 0.75, the sense pending state has a maximum weightage of 0.5, and the GAT entry not loaded state has a maximum weightage of 0.25. Thus, a data fragment 502 which is in the sensed and transferred state with a fragment readiness factor of 1 is more ready to be transferred in contrast to a data fragment 502 in the sensed but transfer pending state with a fragment readiness factor of 0.75. While FIG. 5 illustrates an example of maximum weightages for specified fragment states 508, other example maximum weightages scaled to a factor of 1 may be used.

Each fragment state 508 may also correspond to a sub-weightage 512 or sub-priority from which the fragment readiness factor 505 may also be determined. The controller 123 may have one or more queues in which the data fragments are placed pending loading of a GAT entry, pending sensing by the sense amplifiers 124, or pending transfer from the data latches 126. Thus, data fragments may have different priority levels depending on their position within the queue for each fragment state 508 (e.g. the pending number of a particular task among multiple tasks for each fragment state). In various examples, a data fragment 502 in the GAT entry not loaded state may be one of many in a GAT entry queue to have an entry 406 loaded into the GAT 122, 405, a data fragment 502 in the sense pending state may be one of many in a sense pending queue to be sensed using the sense amplifiers 124, a data fragment in the sensed but transfer pending state may be one of many in a transfer pending queue to be transferred from the data latches 126 by the FIM 128, and a data fragment in the sensed and transferred state may be already stored in the volatile memory 118 or may be in the pipeline (e.g. on a data bus) heading towards the volatile memory 118.

Thus, the sub-weightage 512 is a number corresponding to the state of each data fragment 502 relative to the state of other data fragments 502 in the fragment state 508. The number indicates the respective availability of each data fragment compared to other data fragments in the data unit 119 being transferred to the host device 104. For example, FIG. 5 illustrates that the sensed and transferred state may have sub-weightages between 0.75 and 1 depending on whether the data fragment 502 is in the volatile memory 118 or in the pipeline, the sensed but transfer pending state may have sub-weightages between 0.5 and 0.75 depending on the position of the data fragment in the transfer pending queue, the sense pending state may have sub-weightages between 0.25 and 0.5 depending on the position of the data fragment in the sense pending queue, and the GAT entry not loaded state may have sub-weightages between 0 and 0.25 depending on the position (if at all) of the data fragment in the GAT entry queue. Data fragments 502 which are higher (e.g. next) in each queue will have a higher sub-weightage value than data fragments 502 which are lower in each queue. While FIG. 5 illustrates an example of sub-weightages for specified fragment states 508, other example sub-weightages may be used.

Figure 6A:
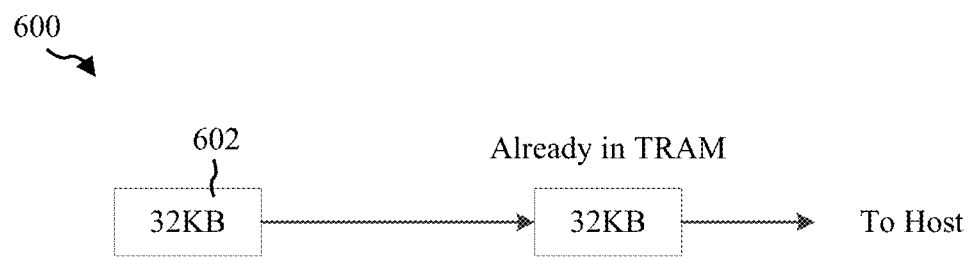
FIGS. 6A-6C are conceptual diagrams illustrating examples of data fragments with different fragment readiness factors.
Figure 6B:
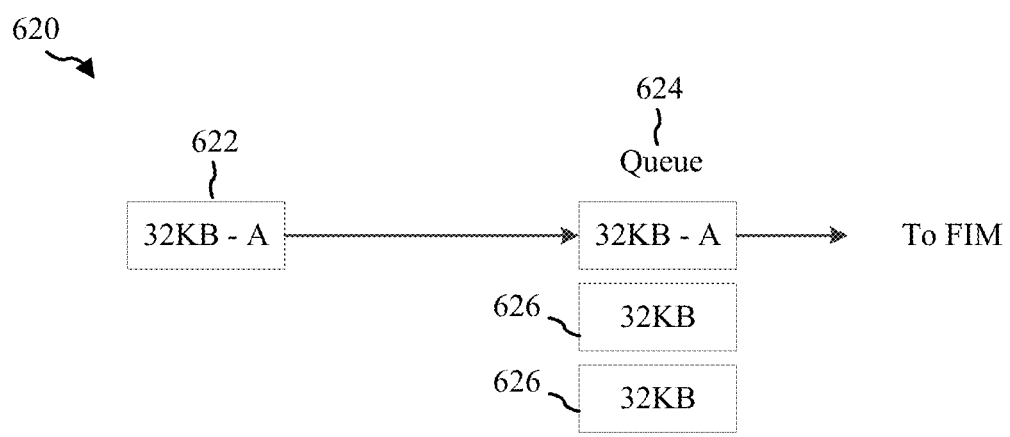
Figure 6C:
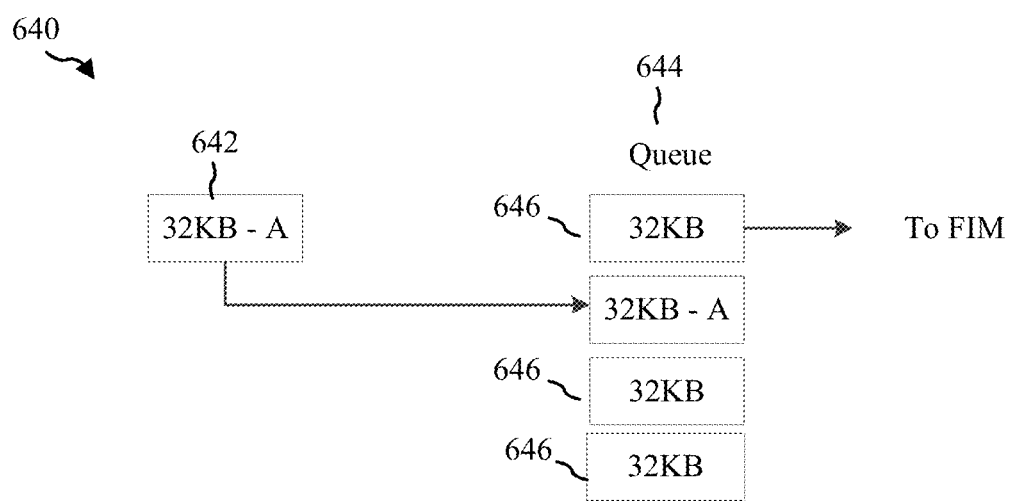

Based on the fragment metadata 504, the controller 123 may be configured to calculate the fragment readiness factor 505 for the data fragment 502 of the data unit 119 associated with a read command 208. FIGS. 6A-6C illustrate example diagrams 600, 620, 640 of data fragments 602, 622, 642 in different fragment states. For example, FIG. 6A illustrates a data fragment 602 in the sensed and transferred state in TRAM awaiting transfer to a host device, FIG. 6B illustrates a data fragment 622 in the sensed but transfer pending state at a first position in a transfer pending queue 624 in line with other data fragments 626 awaiting transfer to the FIM, and FIG. 6C illustrates a data fragment 642 in the sensed but transfer pending state at a second position in a transfer pending queue 644 in line with other data fragments 646 awaiting transfer to the FIM. The data fragments 602, 622, 642 of FIGS. 6A-6C may correspond to the data fragments 502 of FIG. 5. The data fragments 626, 646 may be data fragments of the same data unit or other data units. Based on the fragment states and positions in the queues, the controller may determine a weightage and optionally a sub-weightage for each data fragment 602, 622, 642, and calculate the fragment readiness factor based on the determined weightage and sub-weightage adjustment. While FIGS. 6A-6C illustrate various example data fragments of 32 KB in size, other fragment lengths may be used.

In the example of FIG. 6A, the data fragment 602 is in the sensed and transferred state. Since the data fragment 602 is already in the volatile memory (e.g. the TRAM), it is ready for transfer to the host device, and therefore the controller may calculate the fragment readiness factor for this data fragment to be 1 (i.e. the maximum weightage of 1). In the example of FIG. 6B, the data fragment 622 is in the sensed but transfer pending state. Since the data fragment 622 is in the top of the transfer pending queue 624 (e.g. it is next in line to be transferred by the controller by the FIM), the fragment is ready to be transferred from the data latches to the controller, and therefore the controller may calculate the fragment readiness factor for this data fragment to be 0.75 (i.e. the maximum weightage of 0.75).

In the example of FIG. 6C, the data fragment 642 is also in the sensed but transfer pending state. However, in this example, the data fragment 642 is second in line in the transfer pending queue 644. Therefore the controller may also determine a sub-weightage for the data fragment 642 as a fraction of the maximum weightage of 0.75 based on the number of other data fragments 646 in the queue. As an example, assuming there are four data fragments in total in the transfer pending queue, the controller may determine the sub-weightage (for 4 fragments and a 0.25 weightage range) to be 0.75*¼*¼=~0.047. The controller may then adjust the weightage based on the determined sub-weightage. For example, the controller may calculate the fragment readiness factor for the data fragment 642 to be ~0.70 (i.e. the maximum weightage of 0.75 subtracted by the sub-weightage of 0.047). Similarly, the other data fragments 646 may have fragment readiness factors calculated to be ~0.57, ~0.63, and 0.75, in increasing order of position in the transfer pending queue 644. Other examples of sub-weightage adjustments and fragment readiness factor calculations based on the fragment metadata are possible.

Referring back to FIGS. 1, 2, and 5, based on the fragment readiness factor 505 of each data fragment 206 of a data unit 119 associated with a read command 208, the controller 123 may be configured to calculate a command readiness factor for the data unit 119. The command readiness factor is determined based on the amount of data fragments 206, 502 available for transfer to the host device 104 out of the total data required to execute the read command (e.g. the data unit 119). In one example, the command readiness factor may be calculated based on the following equation:

$$CMD = \sum_{X=1}^{N} \frac{L(X)}{L_C} * F(X) * CMD(X-1), \quad (1)$$

where X represents the current data fragment, N represents the total number of data fragments of the data unit, $L(X)$ is the current fragment length, $L_C$ is the total data unit length for the command, $F(X)$ is the fragment readiness factor for the current data fragment, and $CMD(X-1)$ is the total readiness factor for the prior data fragment, where $CMD(0) = 1$. The above equation is only an example; the command readiness factor may be calculated in other ways based on the fragment length and fragment readiness factors.

When the controller 123 receives multiple read commands 208, the controller may hold each command in a queue for execution. The controller 123 may then calculate a command readiness factor for each read command, for example, using the equation described above. Based on the command readiness factors, the controller may identify a read command to execute from the multiple read commands. For example, the controller may identify the command having the highest command readiness factor of the calculated command readiness factors. The controller may then select that read command for execution, inform the host device of the selected read command (e.g. by setting a corresponding bit in a message to the host associated with the identified read command), and then transfer the data associated with the read command to the host device. The other commands remain pending in the queue until the selected read command has completed execution. Afterwards, the controller may identify another read command to execute by calculating command readiness factors as described above. If the highest command readiness factor is shared by multiple commands, the controller may execute the corresponding commands in a round robin manner.

The controller may be configured not to begin executing a read command unless the first data fragment for that command is readily available for transfer to the host device (e.g. in the sensed and transferred state). Thus, when calculating the command readiness factor, the readiness factor for the first fragment $CMD(0)$ is given the highest priority (e.g. the maximum weightage of 1). As the first data fragment is transferred, the controller may fetch data fragments in the background from the NVM 110. Thus, as later data fragments change fragment states and become readily available for transfer, the controller may transmit earlier data fragments to the host device.

Figure 7A:
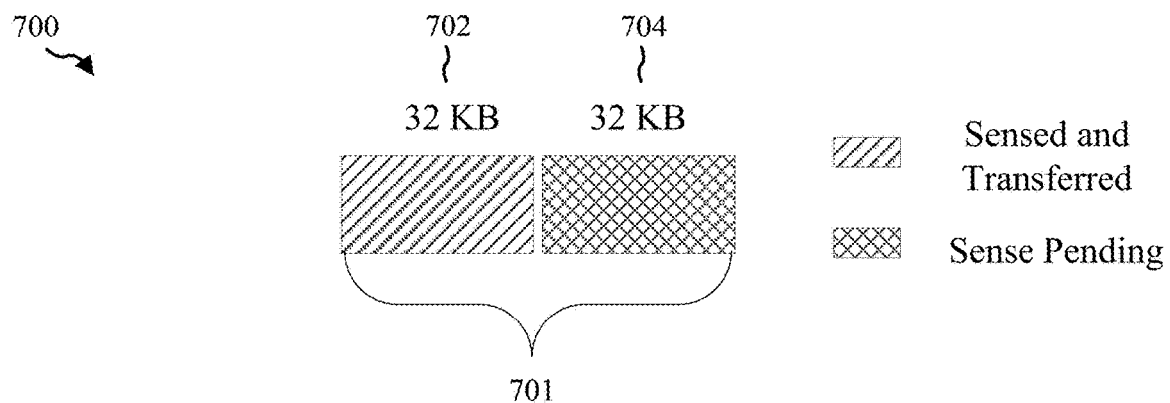
FIGS. 7A-7C are conceptual diagrams illustrating examples of data units with different command readiness factors.
Figure 7B:
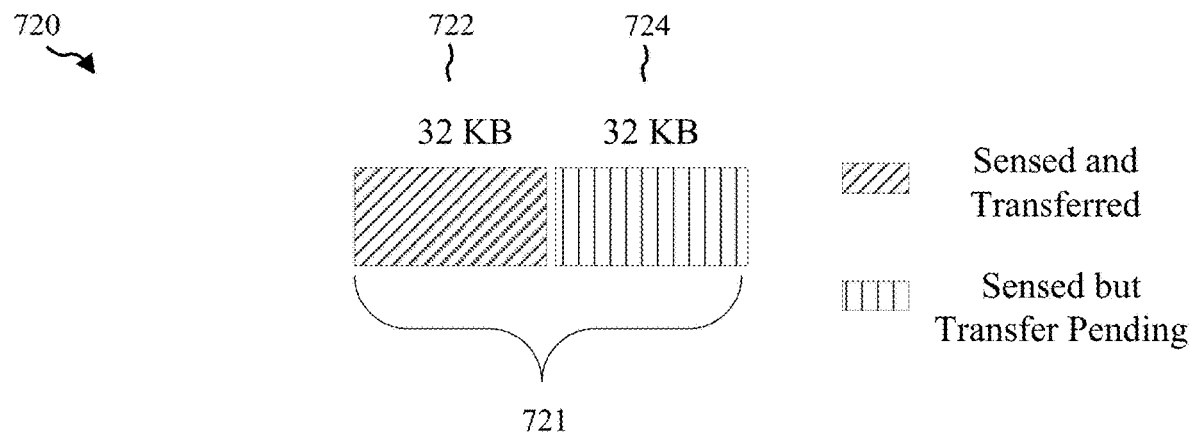
Figure 7C:
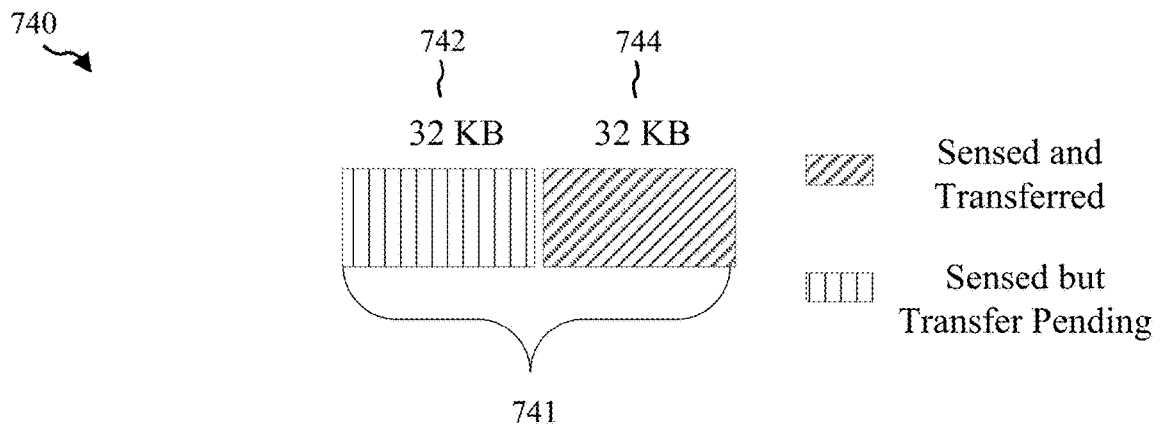

FIGS. 7A-7C illustrate example diagrams 700, 720, 740 of data units 701, 721, 741 respectively including data fragments 702, 704, 722, 724, 742, and 744 in different fragment state combinations. For example, FIG. 7A illustrates a data unit 701 including a first data fragment 702 in the sensed and transferred state and a second data fragment 704 in the sense pending state, FIG. 7B illustrates a data unit 721 including a first data fragment 722 in the sensed and transferred state and a second data fragment 724 in the sensed but transfer pending state, and FIG. 7C illustrates a data unit 741 including a first data fragment 742 in the sensed but transfer pending state and a second data fragment 744 in the sensed and transferred state. The data fragments 702, 704, 722, 724, 742, and 744 of FIGS. 7A-7C may correspond to the data fragments of FIG. 5 and FIG. 6. Based on the fragment readiness factors of each data fragment, the data unit length (e.g. 64 KB), and the fragment lengths (e.g. 32 KB), the controller may determine the command readiness factor for each data unit 701, 721, 741. While FIGS. 7A-7C illustrate various examples where a read command requests a data unit of 64 KB in size, each including two data fragments of 32 KB in size, other data unit lengths, fragment lengths, and numbers of data fragments may be used. Moreover, while FIGS. 7A-7C illustrate examples of calculating the command readiness factor using the equation above, other ways of calculating the command readiness factor are possible.

In the example of FIG. 7A, the first data fragment 702 is in the sensed and transferred state and the second data fragment 704 is in the sense pending state. Based on the above command readiness factor equation, N=2, L(X)=32 KB, $L_C$=64 KB, and CMD(0)=1. Assuming the first data fragment has the maximum fragment readiness factor for the sensed and transferred state (e.g. the fragment is in TRAM), F(1)=1. Moreover, assuming the second data fragment has the maximum fragment readiness factor for the sense pending state (e.g. the fragment is on the top of the sense pending queue), F(2)=0.5. As a result, the controller may calculate the command readiness factor to be 0.625, as follows:

$$CMD = \left(\frac{32}{64} * 1 * 1\right) + \left(\frac{32}{64} * 0.5 * 0.5\right) = 0.5 + (0.5 * 0.5 * 0.5) = 0.625$$

In the example of FIG. 7B, the first data fragment 722 is in the sensed and transferred state, and the second data fragment 724 is in the sensed but transfer pending state. Based on the above command readiness factor equation, N=2, L(X)=32 KB, $L_C$=64 KB, and CMD(0)=1. Assuming the first data fragment has the maximum fragment readiness factor for the sensed and transferred state (e.g. the fragment is in TRAM), F(1)=1. Moreover, assuming the second data fragment has the maximum fragment readiness factor for the sensed but transfer pending state (e.g. the fragment is on the top of the transfer pending queue), F(2)=0.75. As a result, the controller may calculate the command readiness factor to be 0.6875, as follows:

$$CMD = \left(\frac{32}{64} * 1 * 1\right) + \left(\frac{32}{64} * 0.75 * 0.5\right) = 0.5 + (0.5 * 0.75 * 0.5) = 0.6875$$

In the example of FIG. 7C, the first data fragment 742 is in the sensed but transfer pending state, and the second data fragment 744 is in the sensed and transferred state. Based on the above command readiness factor equation, N=2, L(X)=32 KB, $L_C$=64 KB, and CMD(0)=1. Assuming the first data fragment has the maximum fragment readiness factor for the sensed but transfer pending state (e.g. the fragment is on the top of the transfer pending queue), F(1)=0.75. Moreover, assuming the second data fragment has the maximum fragment readiness factor for the sensed and transferred state (e.g. the fragment is in TRAM), F(2)=1. As a result, the controller may calculate the command readiness factor to be 0.5625, as follows:

$$CMD = \left(\frac{32}{64} * 0.75 * 1\right) + \left(\frac{32}{64} * 1 * 0.375\right) = (0.5 * 0.75) + (0.5 * 0.375) = 0.5625$$

As a result, the controller may be configured to determine a higher command readiness factor for a data unit having a first data fragment which is readily available for transfer while the second data fragment is pending (as illustrated in the example of FIG. 7B), than for a data unit having a second data fragment which is readily available for transfer while the first data fragment is pending (as illustrated in the example of FIG. 7C). For example, the controller may calculate a higher command readiness factor for the data unit 721 of FIG. 7B (i.e. 0.6875) than the data unit 741 of FIG. 7C (i.e. 0.5625). Thus, the controller may select to execute the read command for the data unit 721 before executing the read command for the data unit of 741. As a result, in the example of FIG. 7B, the controller may transfer the first data fragment 722 to the host device while fetching the second data fragment 724 from the transfer pending queue in the background, in contrast to the example of FIG. 7C where the controller must wait for the first data fragment 742 to be fetched from the transfer pending queue even though the second data fragment 744 is readily available for transfer. Thus, the overall latency in performing multiple read commands may be minimized.

Accordingly, the present disclosure reduces the latency in executing multiple commands by allowing the controller to dynamically select one of the commands to execute based on fragment metadata. The controller identifies the optimal command having the highest command readiness factor, and transfers the data fragments requested by that command in order before moving on to another command. While the data fragments for the identified command are being transferred, the controller may fetch data associated with other commands from the NVM in the background, thereby reducing the latency in performing these other commands when subsequently selected for execution. Once the identified command has finished executing, and if the controller still needs to arbitrarily select a command (e.g. the controller still has multiple commands in queue), the controller re-calculates command readiness factors and selects another optimal command having the highest command readiness factor.

Moreover, the present disclosure improves the random performance of mixed length read patterns or mixed read-write patterns by allowing the controller to execute various commands based on the run-time availability of data using a full bandwidth of the storage device. For example, the controller may select an optimal command based on whether the GAT entry for the data is loaded, whether the data has been sensed using sense amplifiers, whether the data is stored in data latches and awaiting transfer to the controller, and whether the data is readily available for transfer to the host device. Furthermore, by selecting the optimal command according to a command readiness factor, which is calculated based on fragment lengths and data unit lengths, mixed patterns of commands with shorter lengths may result in higher command readiness factors. Thus, when multiple commands are pending, commands requesting data of shorter lengths may result in faster execution.

In this way, the present disclosure provides intelligence to the controller in selecting commands for execution, and based on command readiness factors, the latency in performing multiple commands may be reduced. Moreover, while data for an earlier command is being transferred to the host, the latency in performing other commands awaiting execution may be further reduced by allowing the controller to obtain data from the NVM in the background for these commands. Improved random performance, mixed performance for varying length and commands and mixed read-write patterns, and QoS may be obtained. The latency in performing random commands may be significantly reduced, as well as the overall latency of performing commands, since the controller may base its selection of a command on the current state of the data in the storage device.

Figure 8:
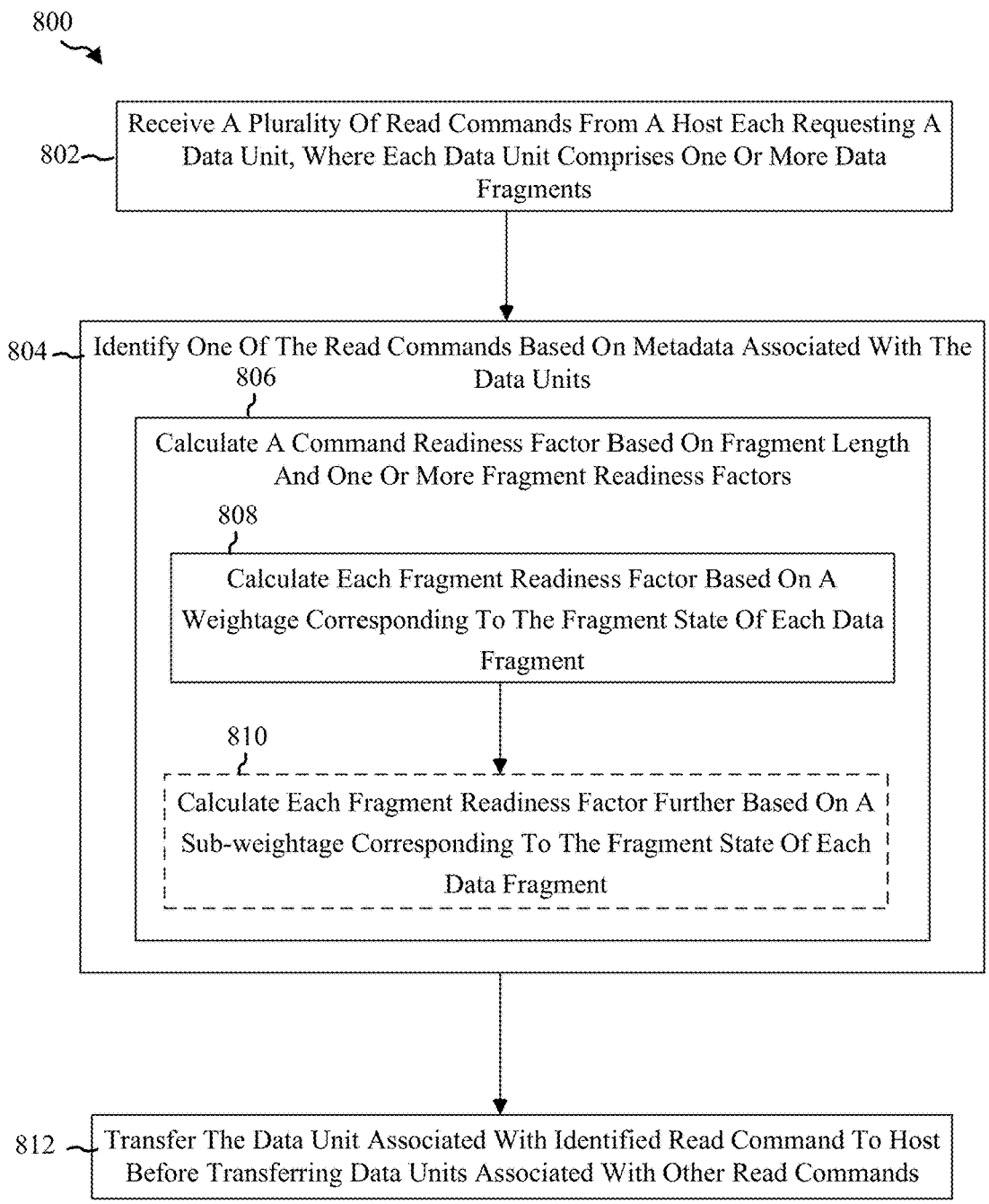
FIG. 8 is a flow chart illustrating an exemplary method for predicting command readiness of data units in a storage device.

FIG. 8 is a flowchart 800 illustrating an exemplary embodiment of a method for selecting a read command for execution from multiple read commands received from a host device. For example, the method can be carried out in a storage device 102, such as the one illustrated in FIG. 1. Each of the steps in the flow chart can be controlled using the controller as described below (e.g. controller 123), or by some other suitable means.

As represented by block 802, the controller receives a plurality of read commands from a host each requesting a data unit. A memory of the storage device stores the plurality of data units requested by the host device. Each data unit also comprises one or more data fragments, and each data fragment may comprise data stored at one or more contiguous memory locations of the memory. The controller may receive from the host a first sequence of read commands each requesting one of the data units, such as a first read command followed by a second read command each requesting one of the data units. For example, referring to FIGS. 1-5, the controller 123 may receive a plurality of read commands 208 from a host device 104 requesting a data unit 119. The data units 119 are stored in NVM 110. Each data unit 119 may be fragmented into one or more data fragments 206, 502, which may be stored in contiguous memory locations. For example, each data fragment 206 may be stored in cells 116 on the same word line of a block 114. The controller 123 may receive from the host device 104 the read commands 208 in a first sequence, for example, a first command for a 128 KB data unit followed by a second command for a 96 KB data unit, each with fragments scattered across multiple dies 204.

As represented by block 804, the controller identifies one of the read commands based on metadata associated with the data units. The metadata may comprise a fragment length and a fragment state of each data fragment in the memory. The memory also stores the metadata associated with the data units. For example, referring to FIGS. 1-5, the controller 123 identifies one of the read commands 208 to execute based on fragment metadata 504 stored in the NVM 110. The fragment metadata 504 may comprise a fragment length 506 of each data fragment (e.g. 32 KB or some other size) and a fragment state 508 of each data fragment. The fragment state may include, for example, a sensed and transferred state, a sensed but transfer pending state, a sense pending state, and a GAT entry not loaded state.

The identified read command at block 804 may be based on a command readiness factor indicating an availability for transfer of the data unit associated with the identified read command. As represented by block 806, the controller may calculate a command readiness factor based on a fragment length of each data fragment associated with the identified read command, and based on one or more fragment readiness factors. For example, referring to FIGS. 1-5, the controller 123 may identify one of the read commands 208 based on a command readiness factor such as CMD calculated above. The controller 123 may calculate the command readiness factor based on the fragment length 506 (e.g. 32 KB or some other size) of each data fragment 502 and based on one or more fragment readiness factors 505. Examples of command readiness factor calculations are described above with respect to FIGS. 7A-7C.

Each fragment readiness factor indicates a respective availability for transfer of each data fragment of the data unit associated with the identified read command. As represented by block 808, the controller may calculate each fragment readiness factor based on a weightage corresponding to the fragment state of each data fragment of the data unit associated with the identified read command. For example, referring to FIGS. 1-5, the controller 123 may calculate the fragment readiness factor 505 for each data fragment 502 of the data unit 119 requested in the read commands 208. The controller 123 may calculate the fragment readiness factor 505 based on a weightage 510 corresponding to the fragment state 508 of each data fragment. Examples of fragment readiness factor calculations based on the weightage 510 are described above with respect to FIGS. 6A and 6B.

Moreover, as represented by block 810, the controller may also calculate each fragment readiness factor further based on a sub-weightage corresponding to the fragment state of each data fragment relative to the fragment states of other data fragments of the data unit associated with the identified read command. For example, referring to FIGS. 1-5, the controller 123 may calculate the fragment readiness factor 505 further based on a sub-weightage 512 corresponding to the fragment state 508 of each data fragment 502 relative to the fragment states 508 of other data fragments requested in the read commands 208. An example of fragment readiness factor calculations based on the sub-weightage 512 is described above with respect to FIG. 6C.

As represented by block 812, the controller transfers the data unit associated with the identified read command to the host device before transferring the data unit associated with the other read commands. The controller may transfer to the host the data units requested by the read commands in a second sequence different from the first sequence, such as the data unit requested by the second read command before the data unit requested by the first read command, based on the metadata. The second sequence may be based on the command readiness factors. For example, referring to FIGS. 1-5, the controller 123 may transfer the data unit 119 associated with one of the read commands to the host device 104 based on the calculated command readiness factor. As an example, even though the controller 123 may receive a first command 208 for a 128 KB data unit prior to a second command 208 for a 96 KB data unit, the controller 123 may identify the second command to have a higher command readiness factor than the first command, and transfer the data fragments 206 corresponding to the second read command of prior to the data fragments 206 corresponding to the first read command. The command readiness factor is calculated based on the fragment metadata 504, including the fragment length 506 and fragment state 508 of each data fragment 502, as described above.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
   memory configured to store data units each comprising one or more data fragments, and metadata associated with the data units, wherein the metadata comprises a fragment state of each data fragment in the memory;
   a controller configured to receive from a host a plurality of read commands each requesting one of the data units, the controller being further configured to select which one of the read commands to execute by transferring a data unit associated with the selected read command from the memory to the host, the selection being based on the fragment state of each data fragment associated with the read commands, and to transfer the data unit associated with the selected read command from the memory to the host before transferring the data unit associated with the other read commands; and
   a volatile memory coupled to the controller,
   wherein the selected read command includes a fragment readiness factor weighted such that at least one data fragment in the data unit has already been transferred to the volatile memory.

2. The storage device of claim 1, wherein each data fragment comprises data stored at one or more contiguous memory locations of the memory.

3. The storage device of claim 1, wherein the metadata further comprises a fragment length of each data fragment in the memory.

4. The storage device of claim 3, wherein the selected read command is based on a command readiness factor indicating an availability for transfer of the data unit associated with the selected read command.

5. The storage device of claim 4, wherein the controller is configured to calculate the command readiness factor based on the fragment length of each data fragment associated with the selected read command and based on one or more fragment readiness factors, each fragment readiness factor indicating a respective availability for transfer of each data fragment of the data unit associated with the selected read command.

6. The storage device of claim 5, wherein the controller is configured to calculate each fragment readiness factor based on a weightage corresponding to the fragment state of each data fragment of the data unit associated with the selected read command.

7. The storage device of claim 6, wherein the controller is configured to calculate each fragment readiness factor further based on a sub-weightage corresponding to the fragment state of each data fragment relative to a fragment state of other data fragments of the data unit associated with the selected read command.

8. A storage device, comprising:
   memory configured to store data units each comprising one or more data fragments, and metadata associated with the data units, wherein the metadata comprises a fragment state of each data fragment in the memory;
   a controller configured to receive from a host a first sequence of read commands each requesting one of the data units, wherein the controller is further configured to select each of the read commands to execute by transferring a data unit requested by the selected read command from the memory to the host, wherein the controller is configured to transfer to the host the data units requested by the read commands in a second sequence different from the first sequence of read commands based on the fragment state of each data fragment associated with the read commands; and
   a volatile memory coupled to the controller,
   wherein the transferred data units include a fragment readiness factor weighted such that at least one data fragment in each data unit has already been transferred to the volatile memory.

9. The storage device of claim 8, wherein the metadata further comprises a fragment length of each data fragment in the memory.

10. The storage device of claim 9, wherein the second sequence is based on command readiness factors indicating an availability for transfer of the data units requested by the read commands.

11. The storage device of claim 10, wherein the controller is configured to calculate the command readiness factors based on the fragment length of each data fragment of each data unit and based on one or more fragment readiness factors, each fragment readiness factor indicating a respective availability for transfer of each data fragment of each data unit.

12. The storage device of claim 11, wherein the controller is configured to calculate each fragment readiness factor based on a weightage corresponding to the fragment state of each data fragment of each data unit.

13. The storage device of claim 12, wherein the controller is configured to calculate each fragment readiness factor further based on a sub-weightage corresponding to the fragment state of each data fragment relative to a fragment state of other data fragments of each data unit.

14. A storage device, comprising:
   memory configured to store data units each comprising one or more data fragments, and metadata associated with the data units, wherein the metadata comprises a fragment state of each data fragment in the memory;
   a controller configured to receive from a host a first read command followed by a second read command each requesting one of the data units, wherein the controller is configured to select one of the first and second read commands to execute by transferring a data unit associated with the selected read command from the memory to the host, wherein the controller is further configured to transfer to the host a data unit requested by the second read command before the data unit requested by the first read command based on the fragment state of each data fragment associated with the first read command and the second read command; and a volatile memory coupled to the controller,
wherein the first transferred data unit includes a fragment readiness factor weighted such that at least one data fragment in the data unit has already been transferred to the volatile memory.

15. The storage device of claim 14, wherein each data fragment comprises data stored at one or more contiguous memory locations of the memory.

16. The storage device of claim 14, wherein the metadata further comprises a fragment length of each data fragment in the memory.

17. The storage device of claim 16, wherein the data unit requested by the second read command is transferred before the data unit requested by the first read command based on command readiness factors indicating an availability for transfer of the data units.

18. The storage device of claim 17, wherein the controller is configured to calculate the command readiness factors based on the fragment length of each data fragment of each data unit and based on one or more fragment readiness factors, each fragment readiness factor indicating a respective availability for transfer of each data fragment of each data unit.

19. The storage device of claim 18, wherein the controller is configured to calculate each fragment readiness factor based on a weightage corresponding to the fragment state of each data fragment of each data unit.

20. The storage device of claim 19, wherein the controller is configured to calculate each fragment readiness factor further based on a sub-weightage corresponding to the fragment state of each data fragment relative to a fragment state of other data fragments of each data unit.

* * * * *